US011057137B2

(12) United States Patent
Kerpez et al.

(10) Patent No.: US 11,057,137 B2
(45) Date of Patent: *Jul. 6, 2021

(54) MANAGEMENT SYSTEM AND METHODS OF MANAGING TIME-DIVISION DUPLEX (TDD) TRANSMISSION OVER COPPER

(71) Applicant: Adaptive Spectrum and Signal Alignment, Inc., Redwood City, CA (US)

(72) Inventors: Kenneth Kerpez, Long Valley, NJ (US); Georgios Ginis, Palo Alto, CA (US); Marc Goldburg, Redwood City, CA (US); Ardavan Maleki Tehrani, Menlo Park, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 281 days.

This patent is subject to a terminal disclaimer.

(21) Appl. No.: 15/928,583

(22) Filed: Mar. 22, 2018

(65) Prior Publication Data

US 2018/0219640 A1    Aug. 2, 2018

Related U.S. Application Data

(63) Continuation of application No. 14/417,544, filed as application No. PCT/US2012/060115 on Oct. 12, 2012, now Pat. No. 9,954,631.

(Continued)

(51) Int. Cl.
*H04M 9/08* (2006.01)
*H04J 3/10* (2006.01)
(Continued)

(52) U.S. Cl.
CPC .................. *H04J 3/10* (2013.01); *H04B 3/32* (2013.01); *H04L 5/14* (2013.01); *H04M 11/062* (2013.01); *H04B 3/487* (2015.01)

(58) Field of Classification Search
CPC ....... H01L 2027/11892; H03M 1/0827; H04N 5/359; H04N 5/3591; H04N 5/361
See application file for complete search history.

(56) References Cited

U.S. PATENT DOCUMENTS 5,887,032 A * 3/1999 Cioffi ........................ H04B 3/32
375/257
6,449,261 B1 * 9/2002 Humphrey .............. H04L 5/023
370/280
(Continued)

FOREIGN PATENT DOCUMENTS

CA        2254807        5/2000
CA        2254807 C      5/2000
(Continued)

OTHER PUBLICATIONS

Office Action dated Feb. 28, 2018, in Chinese Patent Application No. 201280075697.8 (38pgs).
(Continued)

*Primary Examiner* — Solomon G Bezuayehu
(74) *Attorney, Agent, or Firm* — North Weber and Baugh LLP; Michael North

(57) ABSTRACT

Time division duplex transmission over copper physical channels is managed. In one example, upstream time slots for upstream transmission in a first physical channel are scheduled. Downstream time slots for downstream transmission in a second physical channel are scheduled. Transmission in the upstream time slots is substantially not simultaneous with transmission in the downstream time slots.

24 Claims, 6 Drawing Sheets

Related U.S. Application Data

(60) Provisional application No. 61/676,862, filed on Jul. 27, 2012.

(51) Int. Cl.
  H04B 3/32 (2006.01)
  H04M 11/06 (2006.01)
  H04L 5/14 (2006.01)
  *H04B 3/487* (2015.01)

(56) References Cited

U.S. PATENT DOCUMENTS

| | | | |
|---|---|---|---|
| 6,480,475 B1 | 11/2002 | Modlin et al. | |
| 6,819,716 B1 | 11/2004 | Purkovic et al. | |
| 8,355,404 B2* | 1/2013 | Powell | H04L 5/14 370/395.53 |
| 2002/0006190 A1* | 1/2002 | Peeters | H04J 3/0664 379/242 |
| 2003/0048511 A1* | 3/2003 | Tsumori | H04B 10/1143 398/139 |
| 2003/0086362 A1 | 5/2003 | Hosegawa et al. | |
| 2003/0189975 A1* | 10/2003 | Fullerton | H04B 1/69 375/219 |
| 2004/0076174 A1 | 4/2004 | Baum et al. | |
| 2004/0165547 A1 | 8/2004 | Lopes | |
| 2005/0029007 A1* | 2/2005 | Nordin | H01B 11/04 174/113 R |
| 2005/0122999 A1 | 6/2005 | Cherzer et al. | |
| 2005/0220179 A1* | 10/2005 | Tsatsanis | H04L 5/023 375/222 |
| 2009/0082064 A1 | 3/2009 | Li et al. | |
| 2010/0074312 A1* | 3/2010 | Cioffi | H04M 11/062 375/222 |
| 2011/0150121 A1* | 6/2011 | Biyani | H04B 3/32 375/285 |
| 2011/0179456 A1* | 7/2011 | Bar-Niv | H04N 7/106 725/85 |
| 2012/0121029 A1* | 5/2012 | Ahrndt | H04L 5/0023 375/260 |
| 2013/0208579 A1* | 8/2013 | Strobel | H04B 3/32 370/201 |
| 2013/0215951 A1* | 8/2013 | Nuzman | H04B 3/487 375/227 |
| 2013/0272177 A1* | 10/2013 | Wei | H04L 27/2602 370/294 |
| 2013/0272314 A1* | 10/2013 | Kuipers | H04J 3/10 370/437 |
| 2014/0010270 A1* | 1/2014 | Shi | H04M 11/062 375/222 |
| 2015/0215000 A1 | 7/2015 | Colonques et al. | |

FOREIGN PATENT DOCUMENTS

| | | |
|---|---|---|
| CN | 1518844 A | 8/2004 |
| CN | 1606259 A | 4/2005 |
| CN | 1610269 A | 4/2005 |
| CN | 102246442 A | 7/2010 |
| CN | 102487294 A | 6/2012 |
| EP | 1001206 A2 | 6/2000 |

OTHER PUBLICATIONS

Office Action dated Mar. 2, 2018, in Canadian Patent Application No. 2,880,267 (4pgs).
Chayer, "Tutorial on TDD Systems Part 1: Overview of Duplex Schemes," FCC Office of Engineering and Technology, Dec. 3, 2001 (103pgs).
Notice of Allowance dated Feb. 12, 2019, in Canadian Patent Application No. 2880267, filed Oct. 12, 2012 (1pg).
Communication Pursuant to Article 94(3) EPC dated Mar. 14, 2019, in European Patent Application No. 12784144.3, filed Oct. 12, 2012 (9pgs).
Notice of Decision to Grant dated dated Jul. 31, 2018, in Chinese Patent Application No. 201280075697.8 (4pgs).
Office Action dated Jul. 17, 2015, in Australian Patent Application No. 2012385953 (3pgs).
Office Action dated Feb. 5, 2016, in Korean Patent Application No. 10-2015-7004853 (13pgs).
Office Action dated Feb. 25, 2016, in Canadian Patent Application No. 2,880,267 (4pgs).
Response filed Aug. 5, 2016, in Korean Patent Application No. 10-2015-7004853 (34pgs).
Office Action dated Oct. 11, 2016, in Chinese Patent Application No. 201280075697.8 (22pgs).
Office Action dated Nov. 8, 2016, in Korean Patent Application No. 10-2015-7004853 (6pgs).
Response filed Feb. 7, 2017, in Korean Patent Application No. 10-2015-7004853 (28pgs).
Office Action dated Mar. 2, 2017, in Korean Patent Application No. 10-2015-7004853 (5pgs).
Office Action dated Jun. 13, 2017, in Australian Patent Application No. 2016204999 (4pgs).
Notice of Allowance dated Jul. 1, 2017, in Korean Patent Application No. 10-2017-7009038 (6pgs).
Response filed Jul. 19, 2017, in Chinese Patent Application No. 201280075697.8 (5pgs).
Response filed Aug. 25, 2017, in Canadian Patent Application No. 2,880,267 (13pgs).
Office Action dated Sep. 26, 2017, in Chinese Patent Application No. 201280075697.8 (33pgs).
Response filed Dec. 11, 2017, in Chinese Patent Application No. 201280075697.8 (16pgs).
Response filed Mar. 29, 2018, in Australian Divisional Patent Application No. 2016204999 (14pgs).
International Search Report and Written Opinion dated May 2, 2013, in International PCT Patent Application No. PCT/US2012/060115 (9pgs).
International Preliminary Report on Patentability dated Feb. 5, 2015, in International PCT Patent Application No. PCT/US2012/060115 (6pgs).
Office Action dated Jan. 5, 2016, in Japanese Patent Application No. 2015-52424 (4pgs).
Thayer, "Tutorial on TDD Systems Part 1: Overview of Duplex Schemes," FCC Office of Engineering and Technology (103pgs).
Examination Report dated Sep. 3, 2020 in related Canadian application No. 3,047,928, (4 pgs).
Chinese office action 1 and Search Report dated Jan. 6, 2021 in related Chinese application No. 201811187858.8, (27 pgs).

* cited by examiner

MANAGEMENT SYSTEM AND METHODS OF MANAGING TIME-DIVISION DUPLEX (TDD) TRANSMISSION OVER COPPER

CROSS REFERENCE TO RELATED APPLICATION

This is a continuation of U.S. patent application Ser. No. 14/417,544, entitled "MANAGEMENT SYSTEM AND METHODS OF MANAGING TIME-DIVISION DUPLEX (TDD) TRANSMISSION OVER COPPER," naming as inventors Kenneth Kerpez, Georgios Ginis, Marc Goldburg, and Ardavan Maleki Tehrani, and filed Jan. 26, 2015, which is the US National Phase of International Patent Application No. PCT/US2012/060115, entitled "MANAGEMENT SYSTEM AND METHODS OF MANAGING TIME-DIVISION DUPLEX (TDD) TRANSMISSION OVER COPPER," naming as inventors Kenneth Kerpez, Georgios Ginis, Marc Goldburg, and Ardavan Maleki Tehrani, and filed Oct. 12, 2012, which claims the benefit of U.S. Provisional Patent Application No. 61/676,862, entitled "MANAGEMENT SYSTEM AND METHODS OF MANAGING TIME-DIVISION DUPLEX (TDD) TRANSMISSION OVER COPPER," naming as inventors Kenneth Kerpez, Georgios Ginis, Mrac Goldburg, and Ardavan Maleki Tehrani, and filed Jul. 27, 2012, which applications are hereby incorporated herein by reference in their entireties.

FIELD

The present description relates to the field of data transmission in channels subject to crosstalk and, in particular, to scheduling time slot allocations for such channels.

BACKGROUND

TDD (Time Division Duplex) systems transmit downstream (network to subscriber) data and upstream (subscriber to network) data in distinct time slots of the same physical channel. Additionally, there is often a small guard-time between distinct time slots to ensure that data does not overlap. One new TDD system is called 'G.fast,' which is currently in the process of standardization by the ITU-T (International Telecommunication Union-Telecommunication Standardization Sector). G.fast is to transmit over relatively short (<250 m) copper telephone loops and premises wiring.

FIG. 1 is a diagram of slots on a horizontal time axis for a classic TDD system, alternately transmitting downstream from the network toward the subscriber and upstream from the subscriber toward the network in different Down and Up TDD time slots. There is a downstream slot 12, and an upstream slot 14. This is followed by another downstream slot 16 and then an upstream slot 18. The cycle is repeated along the horizontal time axis. The "asymmetry ratio" is the ratio of the size of the Down slot compared to the size of the Up slot. There is usually also a small guard-time (not shown) between each time slot. Each repetition of the two slots may be referred to as a frame. Alternatively, a frame may have multiple repetitions of the two slots.

To reduce power consumption and interference on nearby lines, a power saving TDD system is shown in FIG. 2. FIG. 2 is a diagram of slots on a horizontal axis for the power saving TDD system. Broadband data communication systems are often idle or highly underutilized, and current practice is generally to send idle codes at full power when there is no data traffic. A power saving alternative is to suppress transmission when there is no user data traffic. As shown in FIG. 2, there are two frames 21, 22, TDD frame$_1$, TDD frame$_2$, each having a downstream slot, 23, 27, followed by an upstream slot, 25, 29. In addition, a portion of the downstream slot, in this case the later portion, is an off portion, D_off 24, 28, during which transmission is suppressed. During the off portion, neither data nor idle bits are sent. Similarly the upstream slot, Up, has an off portion U_off 26, 30 at the end of each slot, during which neither data, nor idle bits are sent. Sending no power, during off times "D_off" and "U_off" can provide significant power savings. "D_off" and "U_off" may also be combined into a single off portion.

In many TDD systems, there are multiple physical channels. If these channels are close together in location and overlap in frequency, then they may interfere with each other. FIG. 3 is a diagram of a TDD system with two channels 31, 32. In this example, each channel uses a twisted pair of copper cables and both channels are in the same cable or cable binder. As illustrated in FIG. 3, systems transmitting in multi-pair copper cables can generate crosstalk into each other, Near-End Crosstalk (NEXT) 33 and Far-End Crosstalk (FEXT) 34 are generated by each channel and directed at least in part into the nearby channel.

Each channel is connected between a network-end Transmission Unit-Office (TU-O) 35, 36 and a subscriber-end Transmission Unit-Remote (TU-R) transceiver 37, 38. While each channel is shown as connecting a different TU-O to its own TU-R, a single TU-O can connect to a single TU-R using both of the two channels. This allows more data to be sent to the one TU-R. A single TU-O may also connect to multiple TU-Rs, which is sometimes called "bonding."

NEXT can be very powerful and debilitate high speed transmissions. ADSL (Asymmetric Digital Subscriber Line) and VDSL (Very high bit rate Digital Subscriber Line) use Frequency-Division Multiplexing (FDM) to avoid self-NEXT. Self-NEXT 33 is the crosstalk that is created into neighboring channels as shown in FIG. 3.

SUMMARY

In one example, a method for managing multiple physical channels in a data communications system that are subject to crosstalk is described. The method includes scheduling time slot allocations for the physical channels so that upstream transmissions do not occur at the same time as downstream transmissions. In another example, the method is implemented by a machine operating on a machine-readable medium having stored instructions. In another example, a time slot management system manages multiple physical channels in a data communications system that are subject to crosstalk. The system has a process for determining time slot allocations for the physical channels so that upstream transmissions do not occur at the same time as downstream transmissions and a communications interface to make assignments to transmitters of the physical channels

BRIEF DESCRIPTION OF THE DRAWING FIGURES

Embodiments are illustrated by way of example, and not by way of limitation, and will be more fully understood with reference to the following detailed description when considered in connection with the figures in which.

DETAILED DESCRIPTION

Embodiments of the invention may provide a management system for systems that transmit over wires using Time-Division Duplex (TDD). The management system receives input data about service levels, traffic, power and other requirements. It then determines an assignment of TDD time slots, off times, and asymmetry; for optimal performance, minimal traffic delays, and minimal power usage. The TDD frames are flexible and need not follow a fixed pattern.

One way to avoid self-NEXT is to synchronize the transmissions on the two lines so that one line does not transmit downstream while another line transmits upstream. This is particularly important with TDD systems that have channels that use the same multi-pair cable binder.

Figure 4:
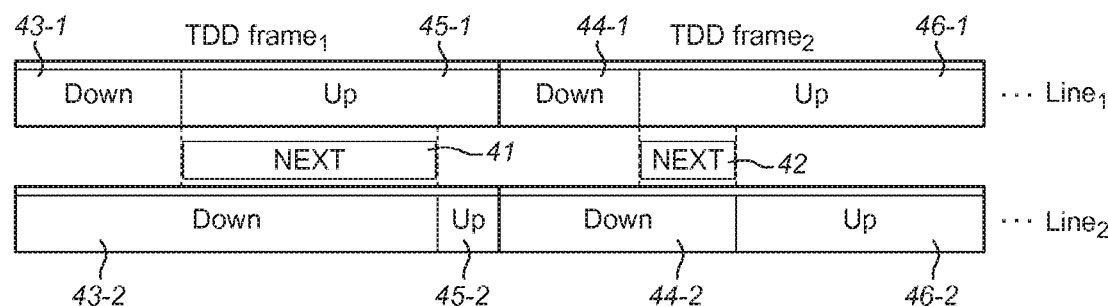
FIG. 4 is a diagram of slot assignments for two related physical channels according to an embodiment of the invention.

FIG. 4 is a diagram showing TDD frames, frame$_1$, frame$_2$, on two different channels, Line$_1$, Line$_2$, which are close enough to cause NEXT 41, 42 in the other line. The frames are shown as aligned across a horizontal time axis. Each frame for each channel has a downstream slot, 43-1, 43-2, 44-1, 44-2, and an upstream slot, 45-1, 46-2, 45-2, 46-2. Even though the TDD frames are aligned, in this case the slots are not. Line$_1$, the upper line, is transmitting predominately in the upstream direction while Line$_2$ is transmitting predominately in the downstream direction. The downstream and upstream misalignment causes NEXT 41, 42 in the nearby line. As shown, the Line$_1$ frame$_1$ upstream slot 45-1 begins before the Line$_2$ frame$_2$ downstream slot 43-2 completes. During this overlap, NEXT 41 is much higher. After the Line$_2$ frame$_2$ downstream slot 43-2 ends and the upstream slot 45-2 begin, NEXT 41 is greatly reduced. A similar overlap occurs in frame$_2$.

Figure 5:
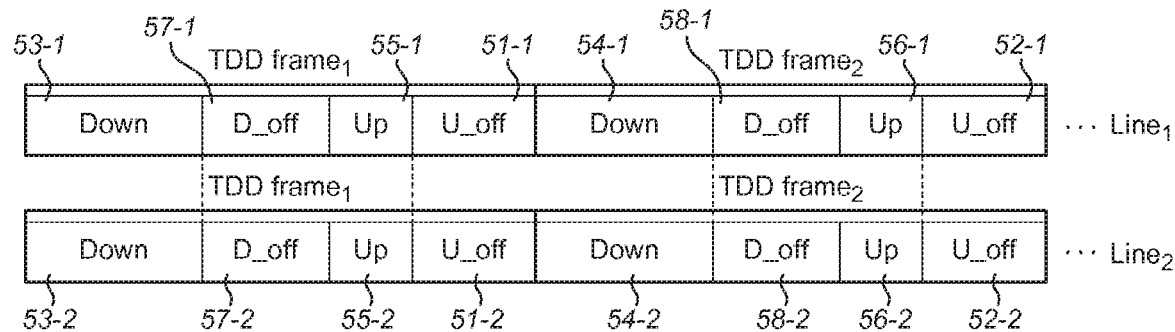
FIG. 5 is a diagram of alternative slot assignments for two related physical channels according to an embodiment of the invention.

One way of avoiding NEXT is to align all the TDD frames, the downstream and upstream time slots, and the off times, as shown for example in FIG. 5. As in FIG. 4, the frame structure frame$_1$, frame$_2$ for two nearby channels Line$_1$, Line$_2$ are shown aligned on a horizontal time axis. Both the upper line, Line$_1$ and the lower line, Line$_2$, have downstream 53-1, 54-1, 53-2, 54-2 and upstream slots 55-1, 56-1, 55-2, 56-2 which are aligned with respect to time. As a result, the two channels will be carrying downstream data at the same time and upstream data at the same time. Since no downstream transmission occurs during an upstream transmission, NEXT is minimized.

In addition, the two frames also have off portions, D_off 57-1, 58-1, 57-2, 58-2, in each downstream slot of each frame and U_off 51-1, 52-1, 51-2, 52-2 in each upstream slot of each frame. Part of each upstream and each downstream slot is shown as being off to save power. The off portions are also aligned.

Figure 6:
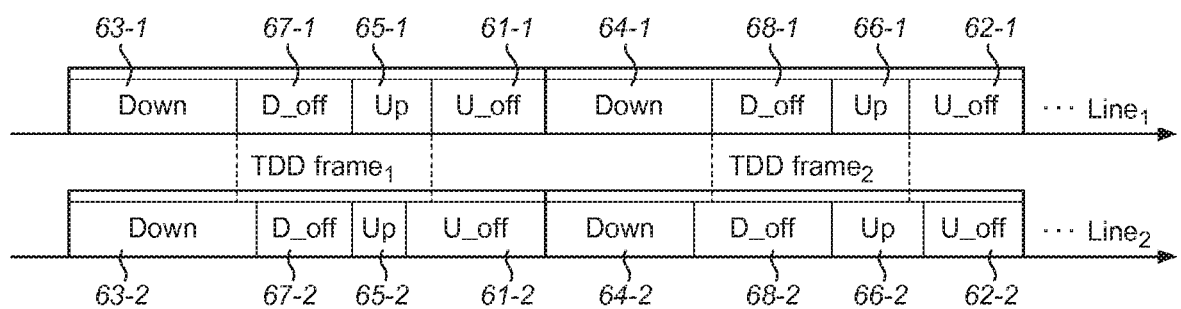
FIG. 6 is a diagram of further alternative slot assignments for two related physical channels according to an embodiment of the invention.

A more flexible way of avoiding NEXT, instead of enforcing perfect alignment of each slot in each frame as in FIG. 5, is to enforce sufficient alignment to avoid transmitting upstream and downstream at the same time on any line. This has the advantage that one line can transmit more data than other lines if it has high demand, while the other lines can be quiet and save power. Further, the frame times can be varied. This, however, has the disadvantage that it requires a high level of control and coordination. FIG. 6 shows an example of this.

FIG. 6 shows two channels an upper, Line$_1$, and a lower, Line$_2$, aligned on a horizontal time axis. The downstream 63-1, 64-1, 63-2, 64-2 and upstream 65-1, 66-1, 65-2, 66-2 portions of these two channels are aligned as in FIG. 5. However, the off portions, the downstream off portions D_off 67-1, 68-1, 67-2, 68-2, and U_off, the upstream off portions 61-1, 66-1, 61-2, 66-2 are not aligned. In order to eliminate NEXT, the off portions do not need to be aligned. When a channel is off, then it is not generating any interference. Each of these off periods do not need to be aligned for all lines in all TDD groups of a multiple channel binder. Embodiments of the invention help to control the off periods and determine how to adapt the off periods for each channel to avoid NEXT and to minimize power usage.

A further method of mitigating NEXT is to employ active NEXT cancellation at the network end of the lines, where the TU-Os are located. This is generally feasible among TU-Os that are in the same equipment chassis, or at least in the same location. In such a case, transmitted data signals, received upstream signals plus NEXT, and the associated error signals are available to a cancellation system or filter, which subtracts estimates of the NEXT from the received signals in real-time. The NEXT canceller may have a zero-forcing structure, a minimum-mean square error (MMSE) structure, a decision-feedback equalizer (DFE) structure, or any other cancellation filter structure. The cancellation coefficients may be calculated at start-up, and may be adapted using error signals while the lines are active.

NEXT cancellation eliminates most of the NEXT from downstream signals into upstream signals, allowing some overlap between downstream and upstream time slots. NEXT from upstream signals into downstream signals occurs primarily at the subscriber ends of the lines where the upstream signals are strongest. The amplitude of this NEXT may be low enough to be ignored due to the attenuation that occurs on drop and inside wires. Transmitting upstream and downstream simultaneously in the same frequencies is known as full-duplex operation, and generally also requires line hybrids and echo cancellers. Compatibility with VDSL2 may be enabled by using NEXT cancellation at the TU-O end of the lines and by not allowing upstream transmission in the VDSL2 downstream frequency bands unless the NEXT is low at the subscriber end of the lines. Different bit loadings may be used when transmitting upstream and downstream simultaneously, and when transmitting in only one direction.

With NEXT cancellation, management of the TDD system proceeds as described elsewhere here, except that some overlap between downstream and upstream time slots may be allowed in some cases or in some time slots. The combination of time slot and frequency-band allocations can be dynamically adjusted for each environment.

Figure 7:
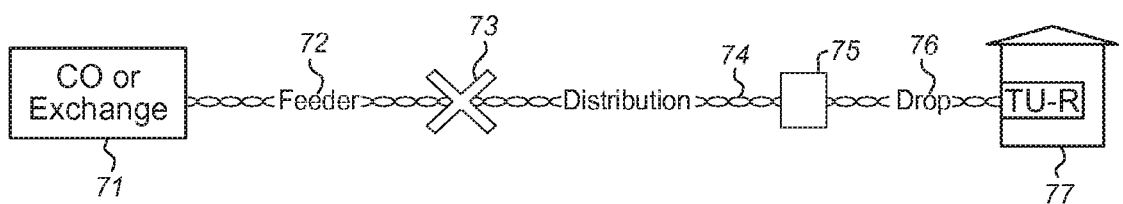
FIG. 7 is a diagram of a twisted pair having at least two related physical channels connected between a central office and an end node.

Several network-end transmission units (TU-O) are often in a single access node. One example of a single access node is a Digital Subscriber Line Access Multiplexer (DSLAM). Referring to FIG. 7, a central office (CO) or exchange 71 is coupled through a feeder 72 to one or more crossboxes or splice points 73, although only one is shown. The crossbox is coupled through a distribution line 74 to one or more drop wire interfaces 75, although only one is shown. The drop wire interface is coupled though one or more drops or drop wires 76 to one or more TU-Rs 77, although only one is shown. Depending on the system implementation, the crossbox 73 may be replaced with or in the form of, for example, a feeder distribution interface (FDI), a serving area interface (SAI), a junction wire interface (JWI), or a sub-loop distribution frame (SDF). The drop wire interface 75 may be replaced with or in the form of a distribution terminal or a deployment point (dP).

The access node or DSLAM (not shown) can be located in the distribution terminal or it can be located somewhere else in the distribution plant, and usually it is fed with optical fiber from the Central Office (CO) or exchange. Downstream of the access node, toward the TU-Rs, crosstalk may be only between lines from a single access node, or there may be crosstalk between lines from multiple access nodes. A set of lines using TDD that all originate at the same access node will be referred to herein as a TDD group.

The invention may be embodied by a TDD management system that coordinates the TDD slot times and the off times of different channels to maximize the transmission of user data traffic while minimizing power. On and off times may be selected to ensure there is no possibility of creating NEXT between lines in a TDD group, or between lines in different TDD groups that have crosstalk coupling into each other. The on and off times may also be chosen to maximize traffic throughput to meet user demands, and to also minimize power consumption by being off when possible.

The TDD management system receives input on the traffic levels, traffic types, and traffic patterns that should be provided on the lines under its control. This input may include one or more of the following:

a) static (time-invariant) data about service subscription levels and their traffic requirements, e.g. a "traffic descriptor;

b) service layer information from a policy manager which provides high-level estimates of data rate requirements based on service requests;

c) data on the behavior of different traffic types, different users, e.g. bit rate variations, traffic behavior, or burstiness;

d) time series data from long term traffic monitoring which is analyzed to determine the traffic demands as a function of time-of-day or time-of-week;

e) instantaneous feedback based on current traffic demands or queue lengths (Queue lengths or traffic requests can be sent from the customer end up to the network-end for input to the TDD management system);

f) upstream and downstream traffic asymmetry patterns; and g) traffic requests or reports.

The traffic can further be classified according to priority level, service type, QoS (Quality of Service), tagging, stream type, protocol type, etc., and this classification information can be input to TDD scheduling algorithms.

The TDD management system uses this input to calculate TDD slot times and off times. The slot times are arranged in such a way as to avoid or reduce NEXT when possible, for example as shown in FIG. 6. Ideally, no two lines that have significant crosstalk coupling into each other can transmit upstream and downstream at the same time. The slot times and off times may also be calculated to satisfy the traffic requested by subscribers, and can further minimize power usage by maximizing off times.

Figure 8:
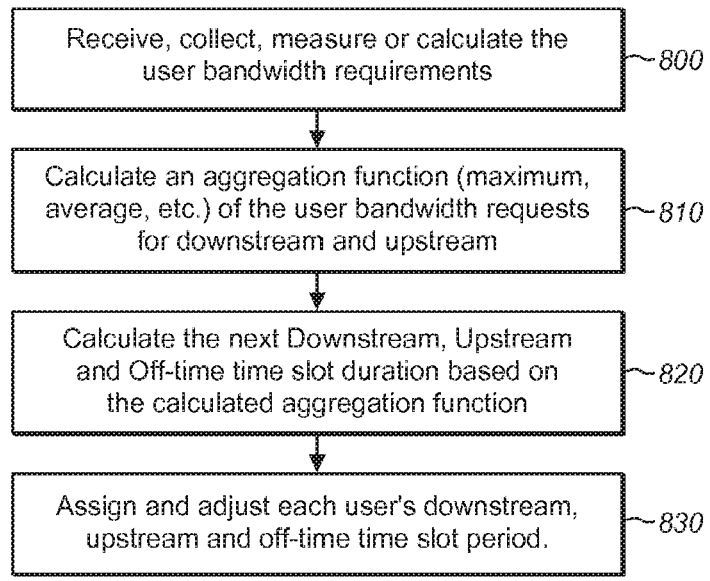
FIG. 8 is a process flow diagram of an example of computing TDD slot times and off times according to an embodiment of the invention.

FIG. 8 is a process flow diagram of an example of computing TDD slot times and off times as described above. At 800, the bandwidth requirements or requests of the users are received, collected, calculated, or measured. The information may be based on the input received by the TDD management system as described above. This information may include any number of different factors including the type of traffic (for example fixed, variable), and the amount of bandwidth requested (for example in Bytes or microseconds). The bandwidth requirements of some users may be fixed over time, such as for streaming video, while the bandwidth of others may vary.

At 810, an aggregation function (maximum, average, etc.) of the user bandwidth requests for downstream and upstream is calculated for different types of traffic. For example, the function could be the maximum of all users' downstream fixed bandwidth requests. Further examples are provided in the next section.

At 820, the next downstream, upstream and off time time slot periods are calculated based on the calculated aggregation function. For example, the next downstream time slot duration could be equal to the sum of the maximum downstream requests for all types of traffic. In such a case, for instance it is guaranteed that no user's bandwidth request would exceed the time slot duration allocated for that type of traffic. Further examples are provided below.

At 830, each user's downstream, upstream and off time time slot periods are assigned and then, if need be, they are adjusted. If the conditions of previous operations are properly satisfied, then each user should be able to receive its requested bandwidth, given limitations or requirements of its traffic type. It is also possible that, for example, the assignments could provide excess bandwidth for certain users. In such cases, adjustments may be made to utilize this excess capacity, for example by assigning variable bit rate traffic to excess fixed bandwidth time slots, or by assigning off time for power savings. Further examples are provided below. The assignment of time slots may be internal to a transceiver, or it may be transmitted from the TDD management system down to the transceiver.

The following provides an example of the process above, for assigning bandwidth at a single access node with mixtures of delay-sensitive fixed bandwidth assignments (e.g., video, voice) and delay-insensitive real-time bandwidth assignments (e.g., data). This example assumes bandwidth requests were converted into time slot requests in microseconds. If user i has a data rate of Z Mbps, and is requesting B bits of traffic, the request equals B/Z microseconds in the next frame.

1) The receive, collect, measure, or calculate operation at 800 may be performed as receiving bandwidth request data input for each user. This data may, for example, include any of the following:

a) Fixed upstream bandwidth requests, e.g. $UX_i$ microseconds dedicated for each user i;

b) Real-time upstream bandwidth requests, e.g. UYi microseconds in the next time slot for user i;

c) Fixed downstream bandwidth requests, e.g. DXi microseconds dedicated for each user i; and d) Real-time downstream bandwidth requests, e.g. DYi microseconds in the next time slot for user i.

2) The calculation of the aggregated function at 810 may be performed in several steps. First, the maximum requested bandwidth of each type in the next frame is calculated. These can be defined, for example, as follows:

a) Maximum fixed upstream bandwidth request e.g. MaxUX=max over i (UXi);

b) Maximum real-time upstream bandwidth request e.g. MaxUY=max over i (UYi);

c) Maximum fixed downstream bandwidth request e.g. MaxDX=max over i (DXi); and d) Maximum real-time downstream bandwidth request e.g. MaxDY=max over i (DYi)

3) The time duration of the next frame may be named TF. The time slot durations can be determined at 820 using different criteria depending on the particular subscriber and system architecture circumstances. Some examples are provided below, where it is assumed that fixed bandwidth requests have strict priority over real-time bandwidth requests.

4) If TF>=MaxUX+MaxUY+MaxDX+MaxDY, then the next upstream time slot duration is MaxUX+MaxUY, the next downstream time slot duration is MaxDX+MaxDY, and the off time in the next TDD frame is TF−(MaxUX+MaxUY+MaxDX+MaxDY).

5) Otherwise, if MaxUX+MaxUY+MaxDX+MaxDY>TF>MaxUX+MaxDX, then the fixed bandwidth requests will be completely satisfied and the real-time bandwidth requests will be partially satisfied. One way of doing this is to divide the real-time bandwidth proportional to the maximum requested real-time bandwidth so that the next upstream time slot duration is MaxUX+(TF−MaxUX−MaxDX)*(MaxUY/(MaxUY+MaxDY), the next downstream time slot duration is MaxDX+(TF−MaxUX−MaxDX)*(MaxDY/(MaxUY+MaxDY), and there is no off time in the next time slot.

6) Otherwise, if TF=MaxUX+MaxDX, then the next upstream time slot duration is MaxUX and the next downstream time slot duration is MaxDX.

7) Otherwise, if MaxUX+MaxDX>TF, then the fixed bandwidth requests are partially satisfied and the real-time bandwidth requests are not satisfied at all. One way of doing this is to divide the fixed bandwidth proportional to the maximum requested fixed bandwidth so that the next upstream time slot duration is TF*(MaxUX/(MaxUX+MaxDX)), the next downstream time slot duration is TF*(MaxDX/(MaxUX+MaxDX)), and there is no off time in the next time slot.

8) Having calculated the functions and the time slot durations, the operations at 830 are performed: assign and adjust each user's downstream, upstream and off time slot period.

There are many variations to the example process described above, depending on the particular application and system architecture, for example the bandwidth may be divided proportional to average upstream and downstream requests instead of maximum, or the bandwidth may simply be split in half, or the bandwidth may be divided along a sliding window that accounts for bandwidth requests in multiple time slots, or the bandwidth may be assigned according to a fairness criteria, or the bandwidth may be assigned according to subscription level, etc. The processes may also be extended to more than two different traffic types. The process may operate on multiple TDD frames at a time.

In the example of using the maximum requested bandwidth as described above, the time slot dedicated to one or more users could exceed the required bandwidth requested by those users. In some cases, the required bandwidth for a user could be significantly less than the assigned time slot. For example, MaxUX+MaxUY could be much larger than the UXi+UYi or MaxDX+MaxDY could be much larger than DXi+DYi for a specific user i. In such cases, the adjustment stated as step 7 above can be utilized.

As one example, the extra bandwidth may be utilized for either saving power or improving latency or some combination of both. The TDD management, as an example may extend the off period for those users, to reduce their power consumption. Alternatively, the TDD management system may accommodate the available extra bandwidth to be used for variable upstream or downstream traffic for those users to allow newly arriving traffic to be transmitted immediately. Conversely, when using the average requested bandwidth in the above algorithm, some user requests might not get satisfied. For example, the fixed bandwidth requests could be partially satisfied. In such cases, steps 5-7 of the above 8-step process for calculating an aggregate function could be modified, where instead of Max; the Average function is used. Other functions may alternatively be used to suit different implementations and different traffic management goals.

Figure 9:
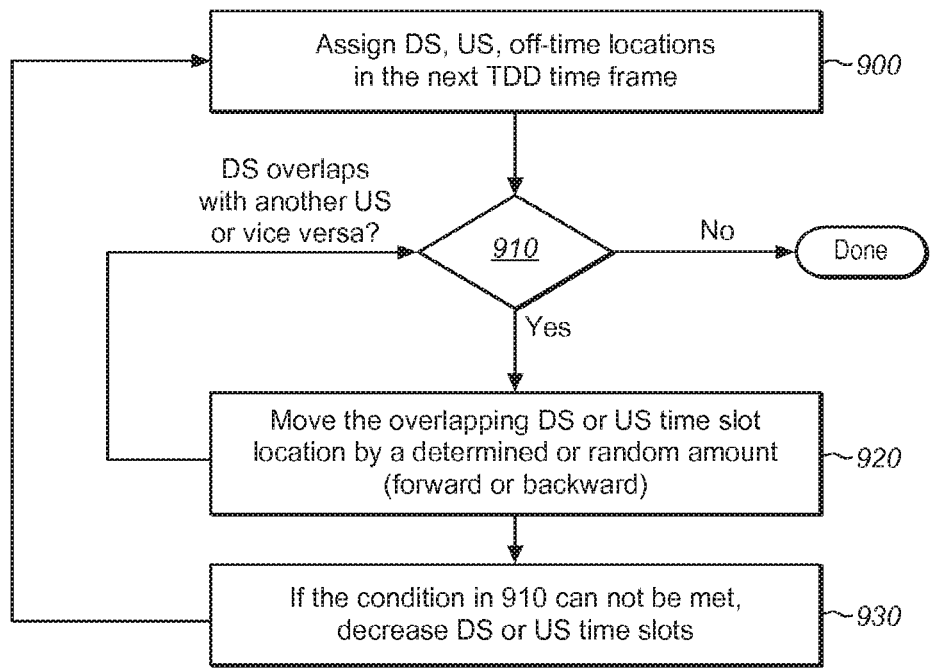
FIG. 9 is a process flow diagram of computing start and end times of time slots according to an embodiment of the invention.

After the time slot durations are calculated, the start and end times of each time slot in the next TDD frame are calculated. This may be a simple assignment anchored at a fixed time such as the beginning or end of a TDD frame. Or it may involve a more involved solution, such as an iterative solution. FIG. 9 is a process flow diagram of an example of computing the start and end times of each time slot in a next or subsequent TDD frame.

At 900, the next downstream (DS) time slot, the next upstream (US) time slot, and the next off time locations are assigned to arbitrary locations in the next TDD frame.

At 910, it is checked whether the downstream time slot is overlapping with another upstream time slot, or vice versa, whether the upstream time slot is overlapping with another downstream time slot. If there is no overlap, then the allocations in step 900 are accepted, and no further action is needed.

If there is an overlap, then at 920, the entire downstream time slot assignment or the entire upstream time slot assignment is moved forward or backward in time, by a predetermined amount or by a random amount. The choice of DS or US is based on whether the overlapping time slot is a DS slot or a US slot from 910.

After this adjustment, the operations at 910 are repeated, and if there are no more overlaps, then no further action is required. However, if there still is an overlap, either with the downstream time slot or with the upstream time slot, then the operations at 920 are repeated. If after the adjustments the non-overlapping conditions cannot be met, then the DS or the US time slot durations are decreased (depending on which one had the overlapping issue), and the initial assignment at 900 is repeated.

A more specific example of the operations in the process flow diagram of FIG. 9 is provided below. As in FIG. 9, this is an example of the above process for computing the start and end times of each time slot in a next TDD frame. In the following example it is assumed that the previous process of FIG. 8 has already been performed, and therefore the next downstream time slot DS duration, the next upstream time slot US duration, and the next off time D_off, U_off duration, have already been determined.

1) As an example of the operations at 900, assign the next downstream time slot, the next upstream time slot, and the next off time(s) to arbitrary locations in the next TDD frame. For example, the next TDD frame may begin with the downstream time slot, then have the next slot be downstream off time D_off, then have the upstream time slot, and then have the next upstream slot be upstream off time U_off. Alternately, the off time may be contiguous and in the beginning, middle, or end of the TDD frame.

2) If the downstream time slot does not overlap with any other upstream time slot of any other TDD system that crosstalks into or from this TDD system, then the process is finished until the next time the slots are adjusted based on new parameters. This is the test at 910.

3) Otherwise, move the entire downstream time slot assignment by x microseconds either forward or backward in time. This corresponds to the operation at 920.

4) Repeat step 4, varying x, until the condition of non-overlap in step 3 is achieved in the downstream direction. x may be varied randomly or it may vary in predetermined steps.

5) If the condition of step 3 cannot be achieved, then decrease the downstream time slot duration and repeat steps 1 through 4.

6) If the upstream time slot does not overlap with the downstream time slot, nor with any other upstream time slot of any other TDD system that crosstalks with this TDD system, then the process if finished.

7) Otherwise, move the entire upstream time slot assignment by y microseconds either forward or backward in time.

8) Repeat step 7, varying y, until the condition of non-overlap in step 6 is achieved in the upstream direction. y may be varied randomly or it may vary in predetermined steps.

9) If the condition of step 7 cannot be achieved, then decrease the upstream time slot duration and repeat steps 6 through 8.

10) Assign the off time. For example, the off time may be contiguous and in the beginning, middle, or end of the TDD frame; or it may be split into two times before or after the upstream and downstream time slots such that it fits in the TDD frame.

11) This procedure may be repeated to assign off times to each line, or each line may autonomously assign off times.

12) Set the times for the next slots, either internally or by communicating with external equipment. If the transceivers are external to the management system, then the management system notifies the transceivers of one or more of the future assignments: beginning of the upstream time slot(s), ending of the upstream time slot(s), duration of the upstream time slot(s), the beginning of the downstream time slot(s), ending of the downstream time slot(s), duration of the downstream time slot(s), the beginning of the off time slot(s), ending of the off time slot(s), duration of the off time slot(s), The calculation of TDD slot times and off times may also be performed in various other ways, by a direct calculation that maximizes the projection of user demands on the achievable space, by iteratively adjusting the slot boundaries from frame-to-frame, via heuristics, by selecting from among a stored set of timings, a generalized algorithm that uses several of these approaches, etc. In addition, the frame length can be variable, the time slot start and end times need not be periodic, and these need not be aligned. Frame lengths can be varied to meet delay requirements, e.g., a short frame when low-delay applications are used. The calculation may simultaneously be applied to multiple TDD frames. All of this may be determined by the TDD management system.

The TDD management system may be made to be capable of converting high-level requests for traffic and power consumption into low-level TDD scheduling. High-level requests may be e.g. an outline of traffic and power requirements, or a general indication of the trade-off between traffic delay and power usage. The TDD management system may also coordinate power savings that are achieved by entering, exiting, or transitioning between multiple power line states. In addition to TDD off times, these power line states can save power by transmitting a lower bit rate with a lower bit loading using a lower transmit spectrum.

Part of each frame time may be reserved on a long-term basis for down and up time slots, with an additional part dynamically varied as traffic comes and goes. The TDD management system then optimizes time slot assignment using both long-term and short-term variations.

TDD up and down time slots and the asymmetry ratio can be varied to minimize average traffic delays and maximize average throughput across all lines in the TDD group. The asymmetry ratio can be defined in terms of time for each slot or in terms of the number of DMT (Discrete Multi-Tone) symbol positions used by a particular user in upstream or downstream. Alternatively, the performance of some set of premium services can be maximized. As a further alternative, the worst-case performance can be maximized. As a further alternative, a more general fairness criterion, such as "alpha-fairness" can be applied to maximize any arbitrarily weighted combination of different user traffic demands.

The TU-Rs are often synchronized to the timing of the TU-O. This timing can be assisted by regularly sending a "synch symbol" downstream that the TU-Rs can lock on to maintain a level of timing synchronization. The TDD management system can determine the times to send synch symbols and the synch symbol durations. When there is very little traffic, the line could be off during an entire down or up time slot, or during an entire TDD frame, or even during multiple TDD frames. Then, the TDD management system can schedule the VTU-O to send enough synch symbols, with enough duration, so that the TU-R maintains or regains synchronization. These synch symbols may be sent in only some time slots, in only some TDD frames, and even using only some subcarriers. The synch symbols can use a low-level modulation for robustness. This enables an inactive TU-R to maintain TDD frame timing so that the TU-R can transmit during an upstream time slot when it wakes up.

A transceiver, such as a TU-R or TU-O may stay in receive-only mode, with the transmitter turned off. This allows power savings by turning off the transmitter. In this mode, the transceiver may also listen to regularly-occurring receptions to maintain synchronization and to hear traffic or instructions to wake up.

An alternative wake-up procedure is for a TU-R to listen to the noise on the line, and determine when there is NEXT by reading regularly-occurring high-power noise once every TDD frame or at any other suitable interval. The TU-R transmits start-up signals when it estimates that this NEXT is active, which should be during an upstream time slot.

There may be a two step process for TU-R wake-up:

1: The TU-R stays approximately synchronized through slow periodic keep alives from the TU-O;

2: When the TU-R wants to start transmitting after some time period of upstream and downstream inactivity (and hence synchronization is only approximate):

a) The TU-R sends a short sync request in what it thinks is the middle of the upstream frame period (sending the short message in the middle ensures that the transmission is entirely within the upstream period);

b) The TU-O responds with a transmission that the TU-R can use for recovering synchronization;

c) Transmission proceeds normally.

Transmission systems adapt to the noise environment on the line, and the described techniques may ensure that adaptation is performed while crosstalking lines are actively creating crosstalk and not during quiet times.

Vectoring technology, as exemplified in the ITU-T G.993.5 standard, is used to cancel at least some FEXT. In order for vectoring to be effective, if it is applied to a TDD group, NEXT should be kept low. So the avoidance of NEXT also allows vectoring to function better. The described techniques can coordinate the TDD timing with the vectoring engine. The TDD management system can reassign vectoring resources in real-time when the TDD asymmetry ratio changes.

The TDD management system can also schedule when to send retransmission units. Retransmission units may be sent at any time. In some embodiments, retransmission units are sent at times that don't cause NEXT problems in a part of what would have been an off time, or retransmission units are sent with multiple retransmissions at other frame times. Retransmissions can be incremental, with all or part of the original data retransmitted, or by sending additional parity bits. Multiple retransmissions can be scheduled, and a block of original data can be retransmitted in one or more blocks of data or parity. Acknowledgements (ACKs) or negative acknowledgements (NACKs) related to retransmission can also be scheduled by the invention.

The avoidance of NEXT between lines in a single TDD group is relatively straight-forward compared to avoiding NEXT with multiple lines. The TDD coordination simply needs to enforce this among the lines from a single access node, which all originate in the same location and so are relatively easy to jointly control.

Figure 10:
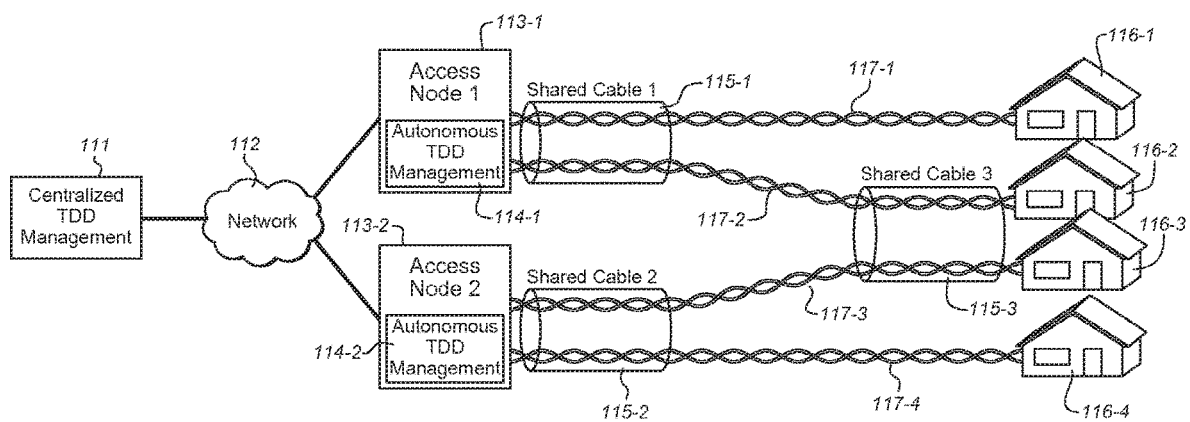
FIG. 10 is a diagram of multiple TDD groups that have crosstalk coupling between some of their lines including autonomous TDD management according to an embodiment of the invention.

FIG. 10 is a diagram of a more complex system implementation in which there are multiple TDD groups that have crosstalk coupling between some of their lines, for example between the two TDD groups in a Shared Cable 3 in FIG. 10. In this case the TDD management may span multiple access nodes, either explicitly with a centralized management element, or autonomously by detecting crosstalk.

Centralized TDD management allows multiple TDD groups to be coordinated directly. Centralized TDD management can use explicit timing information and feedback from access nodes, EMS, or other network elements to then centrally optimize all interacting TDD groups.

As shown in FIG. 10, centralized TDD management 111 may be coupled through a network 112 to multiple access nodes 113-1, 113-2. While only two are shown, there may be many more. The centralized TDD management receives traffic data as described above, performs the assignments and then sends time slot assignments to the access nodes. The access nodes are coupled through communications channels to one or more end nodes or TU-Rs 116-1, 116-2, 116-3, 116-4. The communications channels may be in the form of twisted pair wiring 117-1, 117-2, 117-3, 117-4, or in any other form and may be in one or more binders 115-1, 115-2, 115-3. The binders may be in the form of a shared multiple conductor cable with lines for four or for hundreds of channels.

FIG. 10 illustrates that two channels 117-1, 117-2 that initially are in a common binder or cable and that may generate cross-talk with each other may later be separated and combined with other channels in other binders. As shown, the second twisted pair 117-2 is separated from the first twisted pair 117-1 and later combined with a third twisted pair 117-3 in a third binder 115-3. These two lines now generate crosstalk with each other. This third twisted pair originated with a second binder 115-2. The second and third lines may also be routed to a common or to different end stations 116-2 116-3. The crosstalk generated at any one point between two nearby channels may propagate along any one channel and affect other channels. As an example, the crosstalk generated by the first line 117-1 and received by the second line 117-2 may be coupled to the third line 117-3 in the third shared cable. The third line 117-3 may couple that same crosstalk from the first line 117-1 into a fourth line 117-4.

The connections between lines in different cables or binders may occur in switches, junctions, crossboxes, distribution frames, pedestals, or other types of terminals including network-end terminal, such as TU-R's, or in splice points. In these locations channels can be separated from their original binders and then recombined into different binders or combined at a termination point. TDD systems may alternately not be assigned to separate binders at all, in which case crosstalk will usually arise between them resulting in essentially the same configuration as in FIG. 10.

Autonomous TDD management 114-1, 114-2 at each access node 113-1, 113-2 or at any other point in the system can coordinate multiple TDD groups even though it reads data from, and controls, only a single TDD group. Synchronization may also be performed by measuring the time series of time-varying crosstalk and synchronizing to its patterns. As another alternative, synchronization is performed by measuring the time series of error events and synchronizing to its patterns. This may be done by reading in the time-varying pattern of noise or errors on the lines in the TDD group. Crosstalk from another "alien" TDD system, such as that from a different access node, creates a regularly-occurring pattern of noise as it alternately transmits in both directions, first in one direction, then in the other. This crosstalk can be measured by reading the noise on the lines, or by reading the time-series of error patterns. These can be analyzed on both ends of the line to identify the pattern of the alien TDD groups' up and down time slots. For example, errors occurring in one direction once each millisecond indicate that crosstalk is being generated once each millisecond from the alien TDD groups. The TDD management system can then synchronize its own transmissions to this crosstalk.

Figure 1:
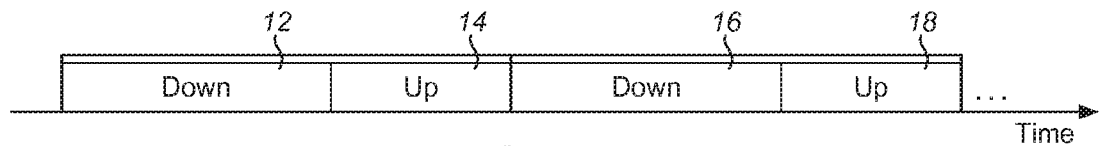
FIG. 1 is a diagram of slots on a horizontal time axis for a classic TDD system.
Figure 2:
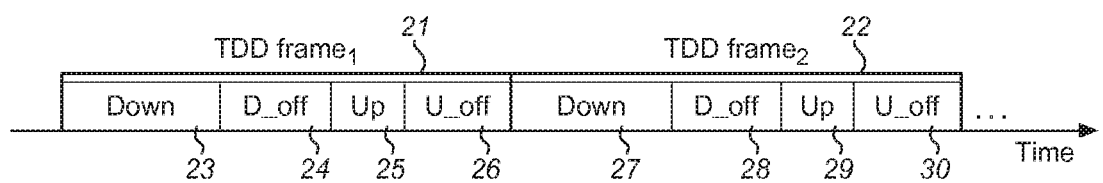
FIG. 2 is a diagram of slots on a horizontal axis for a power saving TDD system.
Figure 3:
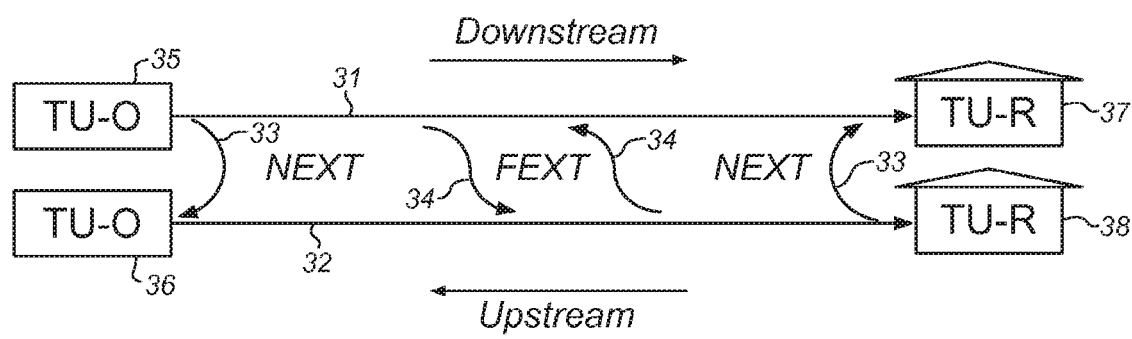
FIG. 3 is a diagram of two related physical channels connected to end nodes in a TDD system.

FIGS. 3, 7, and 10 all show different perspectives of the same communication system. While the time slot assignment may be performed at any of a variety of different locations, in each case, the transmissions are either controlled directly or the controller sends assignments to the appropriate transmitter. The assignments may be sent, e.g., to a transceiver unit (TU), to a crossbox, to a switch, to a junction, to a pedestal or to another type of transmitter whether it is an original signal source or a repeater at any point in the channel. Similarly, the controller can provide synchronization signals that allow the upstream and downstream signals to be coordinated. Synchronization can also be based on signals from a vectoring unit, from an access node, a crossbox, or some other junction point or from an external clock or synchronization source. In one example, synchronization symbols are sent to the sources of upstream transmissions, such as TU-R's.

TDD management may more generally be split between centralized and autonomous methods, using traffic data and TDD synchronization information from:

a) Explicit use of management data and synchronization data from DSLAMs, EMS, OSS or other network elements;

b) Global synchronization data using Global Positioning Satellite (GPS) data or network timing protocols;

c) Autonomous estimation using monitoring data on crosstalk patterns or by reading time-varying noise or error counts;

d) Explicit estimates of crosstalk couplings between lines can be input, for example vectored lines can provide such data as reported Xlin values.

The TDD management system may adjust one or more of the following quantities or other quantities not listed for one or more lines:

a) asymmetry ratio,
b) up and down slot times,
c) off times; and
d) use of low-power or quiescent states;

with the objective of meeting bit-rate requirements and requests, and optionally minimizing power. These can also be set indirectly through higher-level or lower-level control specifications. These can be controlled by slowly changing them as scheduled or as needed after a traffic threshold is crossed; or they can vary in real time. Dynamic Bandwidth Allocation (DBA) or Dynamic Resource Allocation (DRA) can also be all or part of this control. The TDD management system may also interface with, or contain, a Timing Control Entity (TCE).

The TDD management system's capability to detect and adapt to TDD crosstalk can assist in enabling spectral compatibility of TDD systems with FDM (Frequency Division Multiplexed) systems such as VDSL2 (Very high bit rate Digital Subscriber Line, version 2). This can be done by using automated crosstalk identification, coordinating TDD timings, and Dynamic Spectrum Management (DSM) to enable the TDD system to be compatible with VDSL2. Frequency band assignments may further be coordinated to enable spectral compatibility.

Figure 11:
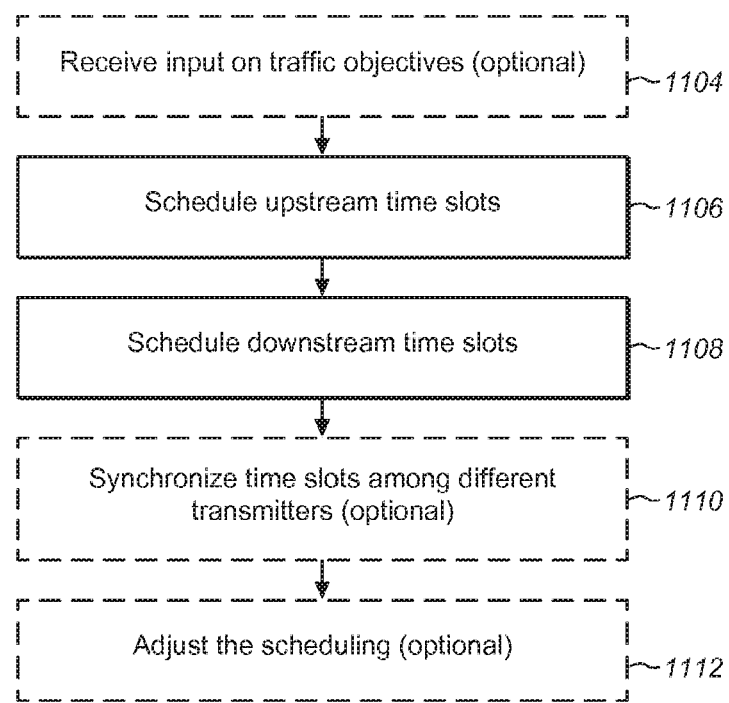
FIG. 11 is a process flow diagram of another example of computing TDD slot times according to an embodiment of the invention.

FIG. 11 is a process flow diagram of scheduling upstream and downstream time slots according to another embodiment. The process flow is specifically intended for use in managing multiple time division physical channels that are subject to crosstalk, however, the invention is not so limited. The scheduling is described here in the context of two physical channels that are subject to crosstalk, however there may be many more than two channels.

At 1104, the TDD management system receives input about traffic objectives for the scheduling of the time slots. This operation is optional. The input is typically received from an external controller, although the TDD management system may be able to monitor the channels or use preset parameters instead of any received input. In a typical DSL system external controllers already generate Operations Support System (OSS) data and Management Information Database (MIB) parameters. This information may be provided to the TDD management system for it use in assigning time slots. Other types of information may also be used. The received input may be of a variety of different types and may include desired traffic levels, static subscription data, service layer information from a policy manager, behavior data for traffic types and users of the physical channels, long term traffic behavior data as a function of time, current traffic demands, queue lengths, traffic requests, upstream/downstream asymmetry, and traffic descriptors. The received input may also include transmission requests from network elements at the network end or the remote end.

At 1106, the TDD management system schedules upstream time slots for upstream transmission in one or more physical channels. AT 1108, the TDD management system schedules downstream time slots for downstream transmission in one or more physical channels. This may be the same channels as the upstream channels or different channels, depending on the nature of the TDD system and the assignment of channels. The upstream channels may be assigned before or after or at the same time as the downstream channels. In these assignments transmission in the upstream time slots is substantially not simultaneous with transmission in the downstream time slots. To make these assignments, all or some of various types of information in the received input can be used. These can be combined in different ways. In one example, optimization criteria are used that weigh different factors.

There are additional factors that may also be considered in the scheduling such as power usage, or a target upstream/downstream asymmetry ratio of data throughput. The data throughput can be defined or measured as an average throughput across all lines, a traffic demand match, a minimum throughput for each physical channel, a perceived quality of experience, an average delay, or a minimum delay.

As mentioned previously, the scheduling may allow some simultaneous transmission in the upstream and downstream time slots. The NEXT that may be caused by the simultaneous transmission may be ignored or the TDD system may also use active NEXT cancellation to cancel NEXT at the network end of the channels.

As a part of the scheduling, the TDD management system will typically send time slot assignments to a corresponding network element. At 1110, the TDD management system may also optionally synchronize times slot among different transmitters. The TDD management system may send synch symbols to source of upstream or downstream transmissions. It may also measure a time series of time-varying crosstalk and then synchronize the time slots to the measured time-varying patterns. Instead of crosstalk patterns, a time series of error events may be measured and used to synchronize.

At 1112, the TDD management system may optionally adjust the scheduling of upstream and downstream time slots. The adjustment may be applied to the next frame or frames, or to the current assignments. The adjustment may accommodate delay requirements for an upstream or downstream traffic source. Many different adjustments may be made such as moving the upstream and downstream time slots in time to reduce simultaneous upstream and downstream transmission, moving only if upstream transmissions overlap downstream transmissions in time, and reducing the duration of at least one downstream time slot to reduce simultaneous upstream and downstream transmission.

Figure 12:
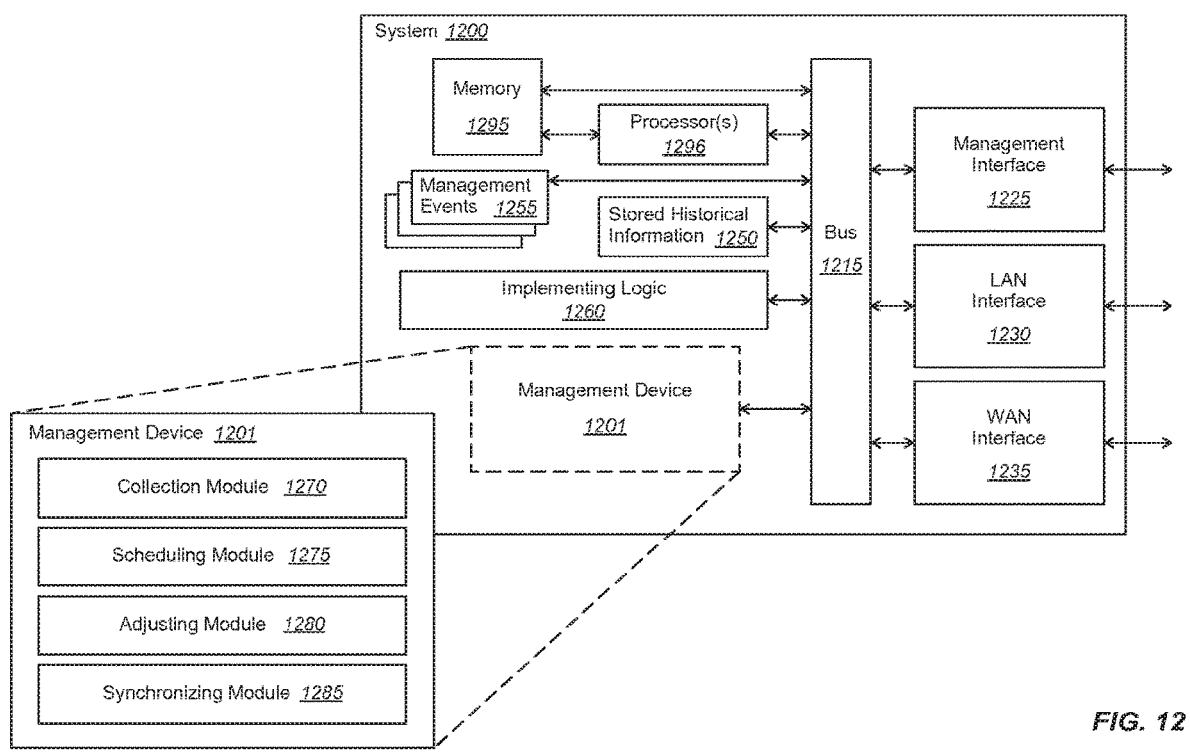
FIG. 12 is a block diagram of a TDD management system according to an embodiment of the invention.

FIG. 12 is a block diagram of a TDD management system 1200 in one example. The system 1200 includes a memory 1295 coupled directly or through a bus to a processor or processors 1296. The memory may be a hard drive, non-volatile memory, solid state memory, or a combination of different memory types for different purposes. The processor may also include its own internal memory. The memory may, for example, store instructions to be executed and the processor may execute the stored instructions. The processor may also implement or execute implementing logic 1260 having logic to implement the methodologies discussed herein. System 1200 includes one or more communications buses 1215 to connect the various illustrated components and to transfer transactions, instructions, requests, and data within the system among the components and other peripheral devices. The system further includes a management interface 1225 coupled to the bus and to external management devices, for example, to receive requests, return responses, and otherwise interface with network elements located separately from the system. This information may include Operations Support System (OSS) data and Management Information Database (MIB) parameters. These network elements may include access nodes, a central office, vectoring units, crossboxes, TU-Rs, and TU-Os.

The system further includes a LAN (Local Area Network) interface 1230 coupled to the bus and externally to communicate information via a LAN based connection, including collecting network information, reporting information and diagnostics to other entities within the network, and for initiating instructions and commands over the network. The system further includes a WAN (Wide Area Network) interface 1235 coupled to the bus and to an external WAN, to communicate information via a WAN based connection for similar purposes and to reach other more remote devices.

In some embodiments, the management interface 1225 communicates information via an out-of-band connection separate from LAN and/or WAN based communications, where "in-band" communications are communications that traverse the same communication means as payload data (e.g., content) being exchanged between networked devices and where "out-of-band" communications are communications that traverse an isolated communication means, separate from the mechanism for communicating the payload data. An out-of-band connection may serve as a redundant or backup interface over which to communicate control data between a management device 1201 and other networked devices or between the management device and a third party service provider.

The system further includes stored historical information 1250 which may be stored within the memory 1295 or as a separate component coupled to the memory or to the bus. The historical information may be analyzed or referenced when conducting long term trending analysis for scheduling time slots and for reporting. Similarly management events 1255 may be stored within the memory or as a separate component coupled to the bus or to the memory. The management events may be initiated responsive to the identification of an operational condition. For example, corrective actions, additional diagnostics, information probes, configuration change requests, local commands, remote execution commands, and the like may be specified by and triggered as a management event 1255. Similarly, operational reports, configuration reports, network activity reports and diagnostic reports may be generated and sent in accordance with stored management events 1255.

A management device 1201 coupled to the bus includes a collection module 1270, analysis module 1275, diagnostics module 1280, and implementation module 1285. Management Device 1201 may be installed and configured in a compatible system 1200 as is depicted by FIG. 12A, or provided separately so as to operate in conjunction with appropriate implementing logic 1260 or other software.

The collection module 1270 collects information from available sources, such as management information, LAN information and WAN information via the external interfaces. The scheduling module 1275 analyzes the information retrieved by the collection module and generates upstream and downstream time slot schedules including, as appropriate, off times and active transmission times. The scheduling module may further perform long term trending analysis based on stored historical information 1250 or conduct neighborhood analysis based on aggregation data yielded from multiple separate and distinct reports, or conduct other joint analysis based on collected information. The adjusting module 1280 adjusts the schedules to better suit the collected information and internal parameters, such as power usage and asymmetry ratio objectives. The results from the adjusting module may be supplied back to the scheduling module, depending on the embodiment. The synchronizing module 1285 synchronizes the scheduled time slots through the external connections 1225, 1230, 1235 so that all of the access nodes, transmitting units, or other components transmit at appropriate times.

The modules of the management device 1201 may be provided as separate components coupled to the bus 1215 as shown or may be incorporated into the processor or memory or another component. The management device may include its own processing and memory resources that interact with the processor and the external interfaces. The management device may include more or fewer modules than those shown. The TDD management system of FIG. 12 is provided only as an example and may be modified to suit different implementations. It may also be incorporated into another component such as an access node, or a TU-O. In one embodiment, the management system is provided as a card in a system rack with a backplane interface to communicate with local and remote network elements.

There are a number of optional and additional advantages and features to the described techniques and systems above. These can be understood in the statements below, among others which may be combined in any of a variety of different ways.

A system has been described above for managing multiple TDD lines, in part, by determining time slot boundaries. The system provides sufficient coordination to avoid NEXT by ensuring that two lines with significant crosstalk coupling do not transmit downstream and upstream at the same time. The system further assigns slot-times and the downstream/upstream asymmetry ratio to maximize a measure of throughput. The maximized measure of throughput is one or more of: the maximum average or minimum average across all lines; chosen to best match traffic demands; chosen to provide a minimum service level to all lines; chosen to ensure user-perceived quality of experience; chosen to minimize average or maximum delays; or chosen to meet any fairness criteria. Other measures of throughput may be used as alternatives or additions, depending on the implementation. The assignment of time slots may be internal to a transceiver, or it may be transmitted from the TDD management system into a transceiver. The TDD management system can further perform Dynamic Bandwidth Allocation (DBA) or Dynamic Resource Allocation (DRA).

The TDD management system can further optimize the scheduling of off time slots to minimize power usage. The TDD management system can further schedule off times during low traffic that suppress transmission for the duration of entire time slot, TDD-frame, or multiple TDD frames. It may save power by controlling entries, exits, and transitions between low-power states. Low-power states save power by transmitting a lower bit rate with a lower bit-loading using a lower transmit spectrum.

The TDD management system can calculate an optimal set of up and down slot times and off times according to an optimization criteria, this criteria can flexibly weigh different tradeoffs between different users, tradeoffs between different services, and tradeoffs between performance and power savings.

The TDD management system adjusts one or more of the following or other quantities for one or more lines: a) asymmetry ratio, b) up and down slot durations, c) up and down slot times, and d) off times. The TDD management system controls the TDD time slot boundaries and off times. This can be a fixed assignment, a slowly varying assignment based on time-of-day, or an assignment that is varied in real time. One or more control parameters such as any one slot time start or end point, slot lengths, asymmetry, up slot time, down slot time, a single off time, and total off time, can be varied while other parameters remain fixed. The TDD management system may employ flexible slot-time boundaries, with variable-length frames, up slot-times, and down slot-times.

The TDD management system receives input on the traffic levels that need to be provided on the lines under its control. This input may include one or more of the following: static (time-invariant) data about service subscription levels and their traffic requirements; service layer information from a policy manager which provides high-level estimates of data rate requirements based on service requests; data on the behavior of different traffic types e.g., burstiness, for different users; time-series data from long-term traffic monitoring which is analyzed to determine the traffic demands as a function of time-of-day or time-of-week; instantaneous feedback based on current traffic demands or queue lengths; and traffic requests or reports sent from the customer end.

The TDD management system can be further controlled by external Operations Support Systems (OSS) or by reading and writing Management Information Database (MIB) parameters. A single TDD group can be managed or multiple TDD groups can be managed. The TDD management system may be a centralized controller that controls multiple lines, and/or multiple TDD groups. Alternatively, the TDD management system may be distributed among multiple pieces of equipment.

The TDD management system can control synchronization of a TDD group. This synchronization can be assisted by using one or more of the following input data: explicit use of management data and synchronization data from DSLAMs, EMS (Element Management Systems), OSS (Operations Support Systems) or other network elements; global synchronization data using Global Positioning Satellite (GPS) data or network timing protocols; autonomous estimation reading time-varying noise that contains crosstalk patterns or by using monitoring data such as error counts.

The timing reference can be further used to control the synchronization of multiple TDD groups. The TDD management system can provide information to assist the synchronization of multiple lines and/or multiple TDD groups.

The TDD management system can determine the times to send synch symbols and the synch symbol durations. The TDD management system can schedule the VTU-O to send synch symbols sufficiently often and with sufficient duration, for the VTU-R(s) to maintain synchronization with the VTU-O. These synch symbols may be sent only in some time slots, in some TDD frames, and only using some subcarriers. The synch symbols can use a low-level modulation for robustness. Long synch symbols can be scheduled to be sent from the VTU-O to recover synchronization after long off times. The TDD management system may further coordinate off times by instructing one or more transceiver(s) to be in receive-only mode, with the transmitter turned off for some time period, or until it receives a signal, or until traffic in a queue crosses a threshold.

An inactive TU-R can listen to the noise on the line, and determine when there is NEXT by reading regularly-occurring high-power noise once every TDD frame. The TU-R then transmits start-up signals when it estimates that this NEXT is active, which should be during an upstream time slot.

The TDD management system may use multiple, distributed components, each operating autonomously. The autonomous TDD system can further read in crosstalk coupling data. The crosstalk data can be used to determine which TDD groups and which lines to coordinate. A combination of centralized and autonomous TDD management can be supported.

The TDD management system can further control FEXT cancellation using, for example, vectoring. Vectoring resources can be re-assigned in real-time when the TDD asymmetry ratio changes. The TDD management system can adapt to satisfy varying delay requirements for different lines, subscribers, services, and at different times. The TDD management system can assist compatibility with FDM systems (e.g., G.fast and VDSL2), use crosstalk identification and "fingerprinting" of FDM and TDD crosstalk. The TDD management system can control retransmission, assign retransmission time slots, coordinate Hybrid retransmission that can re-send multiple parts of a block of data and/or multiple parity bits.

The TDD management system can manage allocation of time slots for acknowledgement messages (ACKs) and/or negative acknowledgement messages (NACKs). The TDD management system can further coordinate TDD groups that have NEXT cancellation or partial NEXT cancellation, thereby allowing some overlap between down and up time slots that have such cancellation.

In this description, numerous specific details such as logic implementations, opcodes, means to specify operands, resource partitioning/sharing/duplication implementations, types and interrelationships of system components, and logic partitioning/integration choices are set forth. It will be appreciated, however, by one skilled in the art that the different implementations may be practiced without such specific details. In other instances, control structures, gate level circuits and full software instruction sequences have not been shown in detail in order not to obscure the description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In this description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. The operations of the flow and signaling diagrams are described with reference to exemplary embodiments. However, it should be understood that the operations of the flow diagrams can be performed by variations other than those discussed with reference to these other diagrams, and the variations discussed with reference to these other diagrams can perform operations different than those discussed with reference to the flow diagrams.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a UE, an eNB, etc.). Such electronic devices store and communicate (internally and/or with other electronic devices over a network) code and data using machine-readable media, such as non-transitory machine-readable storage media (e.g., magnetic disks; optical disks; random access memory; read only memory; flash memory devices; phase-change memory) and transitory machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware While the flow diagrams in the figures show a particular order of operations performed by certain embodiments of the invention, it should be understood that such order is exemplary (e.g., alternative embodiments may perform the operations in a different order, While the invention has been described in terms of several embodiments, those skilled in the art will recognize that the invention is not limited to the embodiments described, can be practiced with modification and alteration. The description is thus to be regarded as illustrative instead of limiting.

What is claimed is:

1. A method in a data communications system for managing multiple physical channels that are subject to crosstalk, the method comprising:
scheduling upstream time slots for upstream transmission in a first physical channel; and
scheduling downstream time slots for downstream transmission in a second physical channel;
wherein during a portion of the upstream and downstream time slots, downstream transmission is simultaneous with upstream transmission; and
wherein near-end crosstalk (NEXT) cancellation at a network end of the channels reduces NEXT from downstream signals into upstream signals during the portion of the upstream and downstream time slots when downstream transmission is simultaneous with a portion of upstream transmission.

2. The method 1 of claim 1, wherein downstream transmission is simultaneous with upstream transmission on some frequencies of some lines in cases where an amplitude of upstream NEXT received by downstream receivers is low.

3. The method of claim 1, wherein an assignment of time-slot boundaries varies over time.

4. The method of claim 1, wherein during another portion of the upstream and downstream time slots, downstream transmission is not simultaneous with upstream transmission.

5. The method of claim 1, wherein:
a frequency band is allocated to downstream transmission, and a frequency band is allocated to upstream transmission; and
a portion of the frequency band allocated to downstream transmission does not overlap a portion of the frequency band allocated to upstream transmission.

6. The method of claim 1, wherein:
during another portion of the upstream and downstream time slots, downstream transmission is not simultaneous with upstream transmission;
a frequency band is allocated to downstream transmission;
a frequency band is allocated to upstream transmission; and
a portion of the frequency band allocated to downstream transmission does not overlap a portion of the frequency band allocated to upstream transmission.

7. The method of claim 6, wherein one or more of: time slot allocations and frequency band allocations, are dynamically adjusted for each traffic and transmission environment.

8. The method of claim 1, wherein compatibility is enabled between a time division duplex (TDD) system and a frequency division duplex (FDD) system.

9. The method of claim 1, wherein compatibility with a second system is supported by using dynamic spectrum management (DSM) methods.

10. The method of claim 1, wherein the DSM methods are performed in one or more of: a remote management system, a cloud-based system, a virtual system, a transceiver, a digital subscriber line access multiplexer (DSLAM), a network element, and a distribution point unit (DPU).

11. A method in a data communications system for managing multiple time division physical channels that are subject to crosstalk, the method comprising: scheduling upstream time slots for upstream transmission in a first physical channel; scheduling downstream time slots for downstream transmission in a second physical channel wherein downstream transmission is simultaneous with upstream transmission, and wherein near-end crosstalk (NEXT) cancellation at a network end of the channels reduces NEXT from downstream signals into upstream signals during a portion of the upstream and downstream time slots when downstream transmission is simultaneous with a portion of upstream transmission; and time-slot boundaries are dynamically set and update the scheduling of the upstream time slots and the scheduling of the downstream time slots.

12. The method of claim 11, wherein transmission in the upstream time slots is substantially not simultaneous with transmission in the downstream time slots.

13. The method of claim 11, wherein the scheduling of the upstream time slots and the scheduling of the downstream time slots is dynamically set by changing the number of downstream symbol periods of the time division duplex (TDD) frame.

14. The method of claim 11, wherein time-slot boundaries are dynamically set during operation where live user data are being transmitted without re-initialization of the transmission channel.

15. The method of claim 11, wherein scheduling upstream time slots for upstream transmission in a first physical channel; and scheduling downstream time slots for downstream transmission in a second physical channel is performed upon request by a dynamic resource allocation (DRA) function.

16. The method of claim 11, wherein scheduling upstream time slots for upstream transmission in a first physical channel; and scheduling downstream time slots for downstream transmission in a second physical channel is coordinated across multiple lines.

17. The method of claim 11, wherein scheduling downstream time slots for downstream transmission in a second physical channel reduces the duration of at least one downstream time slot.

18. The method of claim 11, wherein:
scheduling upstream time slots for upstream transmission in a first physical channel; and
scheduling downstream time slots for downstream transmission in a second physical channel applies to multiple contiguous time division duplex (TDD) frames.

19. The method of claim 11, wherein:
scheduling upstream time slots for upstream transmission in a first physical channel; and
scheduling downstream time slots for downstream transmission in a second physical channel is based on one or more of: a bandwidth request, a bandwidth requirement, a traffic rate, a queue length, a current traffic demand, a traffic type, a traffic pattern, and a traffic request.

20. The method of claim 11, wherein:
scheduling upstream time slots for upstream transmission in a first physical channel; and
scheduling downstream time slots for downstream transmission in a second physical channel uses data across multiple time slots.

21. The method of claim 11, wherein:
scheduling upstream time slots for upstream transmission in a first physical channel; and
scheduling downstream time slots for downstream transmission in a second physical channel is changed after a traffic threshold is crossed.

22. The method of claim 11, wherein retransmission units are sent at times that do not cause near end crosstalk (NEXT).

23. The method of claim 11, wherein the ratio of downstream time slots for downstream transmission to upstream time slots for upstream transmission, is varied for one or more of the following purposes: to minimize traffic delays, and to maximize throughput, on one or more lines.

24. The method of claim 11, wherein the management method is performed in one or more of: a remote management system, a cloud-based system, a virtual system, a transceiver, a digital subscriber line access multiplexer (DSLAM), and a distribution point unit (DPU).

* * * * *